(12) United States Patent
Steward et al.

(10) Patent No.: US 11,724,893 B1
(45) Date of Patent: Aug. 15, 2023

(54) ASSEMBLY LINE HAVING CARRIER FOR TRANSPORTING COMPONENTS AND METHOD OF OPERATION THEREOF

(71) Applicant: Renaissance Lakewood, LLC, Lakewood, NJ (US)

(72) Inventors: Jeff Steward, Lakewood, NJ (US); Bob Wood, Lakewood, NJ (US)

(73) Assignee: RENAISSANCE LAKEWOOD, LLC, Lakewood, NJ (US)

( * ) Notice: Subject to any disclaimer, the term of this patent is extended or adjusted under 35 U.S.C. 154(b) by 0 days.

(21) Appl. No.: 17/748,865

(22) Filed: May 19, 2022

(51) Int. Cl.
*B65G 49/00* (2006.01)
*A61J 1/16* (2023.01)

(52) U.S. Cl.
CPC .............. *B65G 49/00* (2013.01); *A61J 1/16* (2013.01); *B65G 2201/0235* (2013.01)

(58) Field of Classification Search
CPC ...... B65G 17/002; B65G 17/18; B65G 17/32; B65G 2201/02; B65G 2201/0261; B65G 35/08; B65G 47/248; B65G 49/00; B65G 2201/0235; A61J 1/16
See application file for complete search history.

(56) References Cited

U.S. PATENT DOCUMENTS 6,293,387 B1 * 9/2001 Forster ................ B65G 47/248
198/795

* cited by examiner

*Primary Examiner* — Lee A Holly
(74) *Attorney, Agent, or Firm* — Hahn Loeser & Parks LLP

(57) ABSTRACT

An assembly line having a carrier for transporting components which is structured and dimensioned for receiving components of two different devices, so that the assembly line can be switched from assembling one device to assembling the other device without changing or altering the series of carriers on the assembly line, and a method of operating the assembly line.

10 Claims, 12 Drawing Sheets

ASSEMBLY LINE HAVING CARRIER FOR TRANSPORTING COMPONENTS AND METHOD OF OPERATION THEREOF

The present description relates to a carrier for transporting components on an assembly line that is structured and dimensioned for receiving components of two different devices, so that the assembly line can be switched from assembling one device to assembling the other device without changing or altering the series of carriers on the assembly line.

BACKGROUND

In some instances, a single assembly line can be used for assembling different devices whose respective components are similar to each other but have different dimensions and shapes. Switching that assembly line from assembling one device to assembling another can be a time-consuming evolution that idles production and is inefficient. One example is an assembly line that assembles nasal spray devices. Such devices may comprise three components that are assembled together: a filled vial, a vial holder into which the filled vial is inserted, and an actuator grip that is inserted over and surrounds at least part of the vial holder and filled vial. Such devices come in at least two sizes containing different amounts of nasal spray. Switching an assembly line from assembling one size to assembling another is time consuming and inefficient, considering that producing of such devices is measured in hundreds of doses per minute.

SUMMARY

A method of operating an assembly line having assembly stations and a plurality of carriers for transporting components of a vial-based device between the assembly stations is provided. Each carrier comprises first and second device receptacles, the first device receptacle being structured and dimensioned differently than the second device receptacle, the first device receptacle being adapted for receiving components of a first vial-based device, and the second device receptacle being adapted for receiving components of a second vial-based device. The carrier is further adapted for attachment to a car that travels along the assembly line, the plurality of carriers being arranged in a series of cars. The method comprises the steps of assembling a plurality of either one of the first and second vial-based devices; switching the assembly line to assemble the other one of the first and second vial-based devices without changing or altering the series of the carriers on the assembly line; and assembling a plurality of the other one of the first and second vial-based devices.

The first device receptacle may comprise a first vial holder support for receiving a first vial holder of the first vial-based device. The first device receptacle may comprise a first actuator grip support for receiving a first actuator grip of the first vial-based device.

In another example, the first device receptacle comprises a cylindrical tube, having a top that is open wide enough for receipt of a first actuator grip of the first vial-based device, having a diameter and a length structured to support the first actuator grip, and having a bottom with a circular opening that is wide enough for at least part of a first vial holder of the first vial-based device to pass through the opening but narrow enough to prevent the first actuator grip from passing through the opening; and a bottom support located underneath the bottom of the cylindrical tube, and structured to support the at least part of the first vial holder passing through the opening.

In some examples, when the method is in operation, the at least part of the first vial holder passes through the cylindrical tube and through the opening, and is supported by the bottom support and by the bottom of the cylindrical tube; a first filled vial of the first vial-based device is inserted into the first vial holder after the at least part of the first vial holder has passed through the cylindrical tube and through the opening and the at least part of the first vial holder is supported by the bottom support and by the bottom of the cylindrical tube; and the first actuator grip is inserted over and surrounds at least part of the first vial holder and the first filled vial, and is supported by the cylindrical tube, after the first filled vial has been inserted into the first vial holder. The method cylindrical tube may be freely rotatable about its vertical axis to any angular orientation within the first device receptacle.

The second device receptacle may comprise a second vial holder support for receiving a second vial holder of the second vial-based device. The second device receptacle may comprise a second actuator grip support for receiving a second actuator grip of the second vial-based device.

The second device receptacle may comprise: a top support having a length and a width structured to allow a second actuator grip of the second vial-based device to fit over and to be supported by the top support, and having a circular opening that is wide enough for at least part of a second vial holder of the second vial-based device to pass through the opening; and a bottom support located underneath the top support, and structured to support the at least part of the second vial holder passing through the opening.

In some examples of when the method is in operation, the at least part of the second vial holder passes through the opening, and is supported by the bottom support and by the top support; a second filled vial of the second vial-based device is inserted into the second vial holder after the at least part of the second vial holder has passed through the opening and the at least part of the second vial holder is supported by the bottom support and by the top support; and the second actuator grip is inserted over and surrounds the top support and at least part of the second vial holder and the filled second vial, and is supported by the top support, after the second filled vial has been inserted into the second vial holder.

In some embodiments, an assembly line for assembling first vial-based devices and second vial-based devices, the first vial-based devices being dimensioned differently than the second vial-based devices are provided. The assembly line comprises a series of the carriers, a series of the cars, the series of the carriers being attached to the series of the cars, respectively; a series of the assembly stations; and a conveyor system for transporting the cars between the assembly stations.

Each carrier comprises: first and second device receptacles, the first device receptacle being adapted for receiving components of the first vial-based device, and the second device receptacle being adapted for receiving components of the second vial-based device. The carrier is adapted for attachment to a car that travels along the assembly line. When a series of the carriers is attached to a series of the cars, respectively, the assembly line can be switched from assembling either one of the first and second vial-based devices to assembling the other one of the first and second vial-based devices without changing or altering the series of the carriers on the assembly line.

The assembly line may further comprise: a vial holder insertion station for inserting a first or a second vial holder into each of the carriers; a filled vial insertion station for inserting a first or a second filled vial into the vial holder that has been inserted into each of the carriers; and an actuator grip insertion station for inserting a first or a second actuator grip over and surrounding at least part of the vial holder and filled vial that has been inserted into each of the carriers. The components of the first vial-based device comprise the first vial holder, the first filled vial, and the first actuator grip. The components of the second vial-based device comprise the second vial holder, the second filled vial, and the second actuator grip. The series of assembly stations comprise the vial holder insertion station, the filled vial insertion station, and the actuator grip insertion station.

The series of assembly stations may further comprise a packaging directing station for directing the assembled first and the second vial-based devices to a selected station for packaging.

The assembly line may further comprise a pull-test mechanism that has a first part for gripping an actuator grip of at least one of the first and second vial-based devices after assembled, and a second part for gripping a vial holder of the least one of the first and second vial-based devices after assembled, the first and second parts being connected by a spring and being operated by temporarily pulling them apart to a specified tension to test whether the actuator grip is secured to the vial holder.

The assembly line may further comprise: a series of individual mover pucks; each individual mover puck being a holder into which either the assembled first vial-based device or the assembled second vial-based device is placed for transport along a conveyor belt; where each individual mover puck being structured and dimensioned to accommodate either the assembled first vial-based device or the assembled second vial-based device, whichever is required.

The assembly line may further comprise a labeling station, wherein the labeling station comprises at least a first labeling module capable of applying wrap-around labels when assembling at least one of the first and second vial based devices and applying spot labels when assembling the other of the first and second vial based devices. The labeling station may further comprise a second labeling module capable of applying spot labels when assembling the other of the first and second vial-based devices.

BRIEF DESCRIPTION OF THE DRAWINGS

The following drawings illustrate the concepts of the present invention. Illustrations of exemplary embodiments are not necessarily drawn to scale.

DETAILED DESCRIPTION

Figure 1:
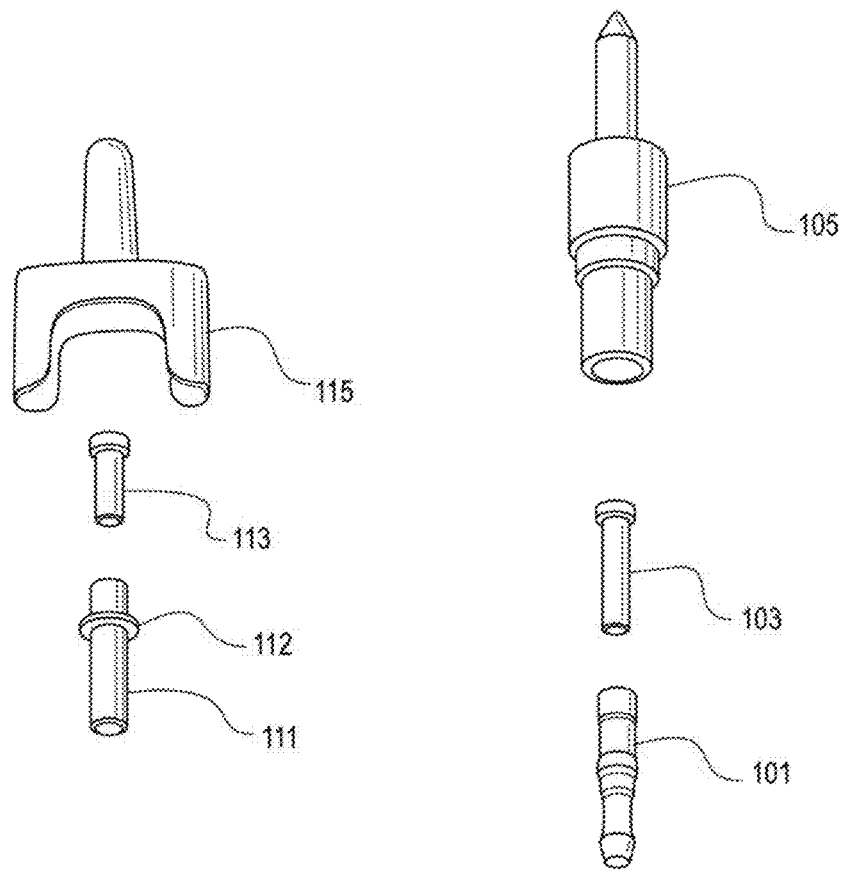
FIG. 1 illustrates exemplary components of a Bi-Dose device and of a Unit-Dose device.

FIG. 1 illustrates exemplary components of a Bi-Dose device: vial holder 101, filled vial 103, and actuator grip 105; and of the Unit-Dose device: vial holder 111, filled vial 113, and actuator grip 115. Actuator grip 105 may be modified to include additional area for engagement with a user's fingers during use. Advantageously, an assembly line using the carriers described and claimed in the present application can assemble 200 units per minute, without lengthy downtimes for switching from assembling a Bi-Dose device to assembling a Unit-Dose device and vice versa.

Figure 2:
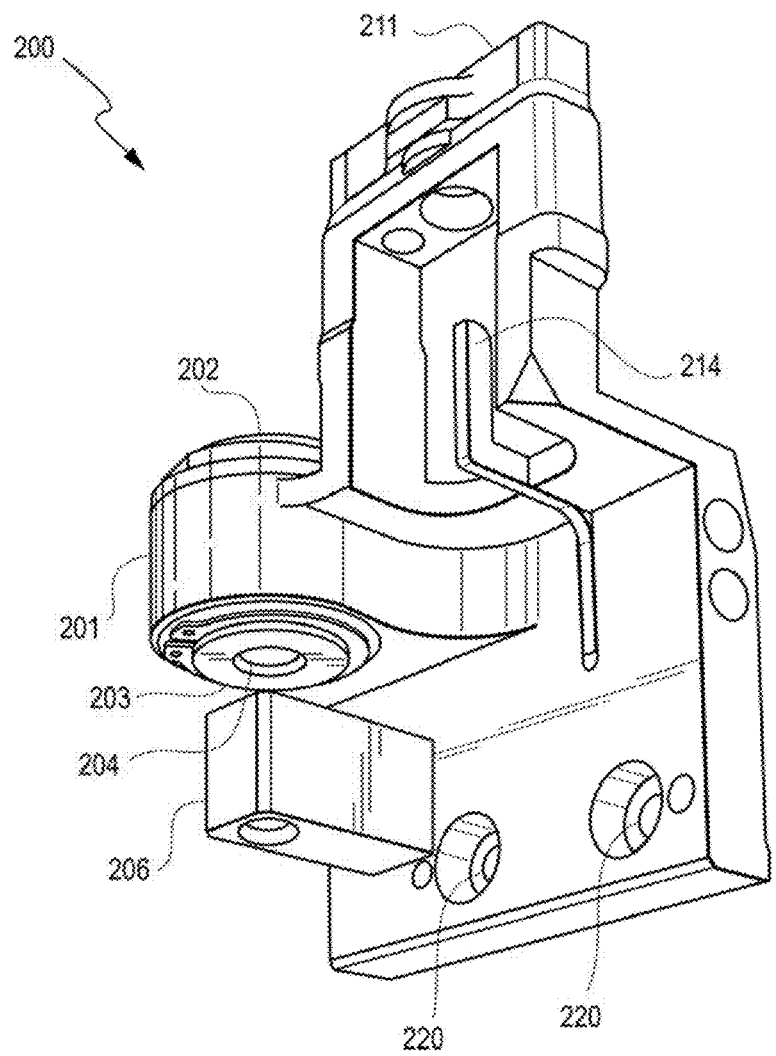
FIG. 2 shows a perspective view of an example of a carrier for transporting components of a vial-based device between assembly stations on an assembly line.
Figure 3:
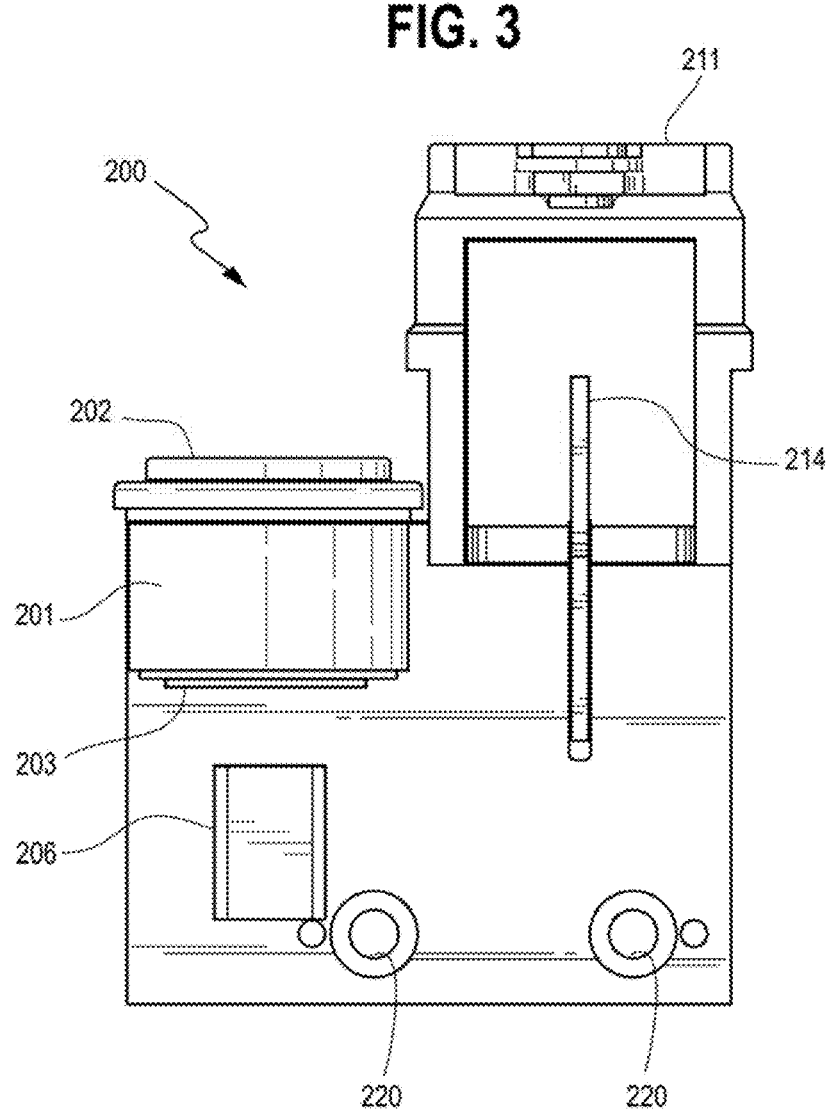
FIG. 3 shows a front view of the carrier of FIG. 2.
Figure 4:
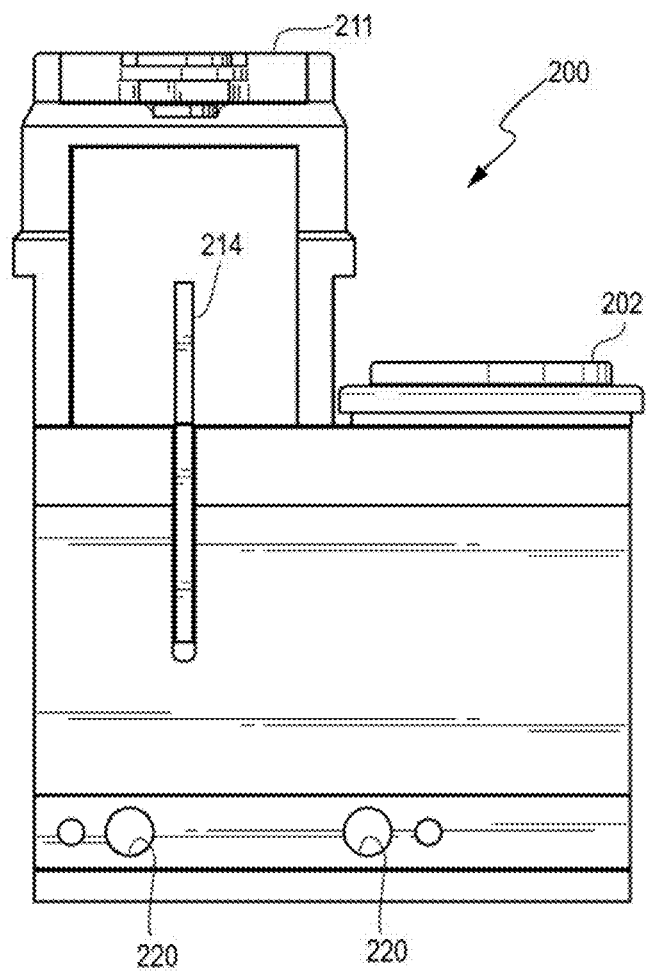
FIG. 4 shows a rear view of the carrier of FIG. 2.
Figure 5:
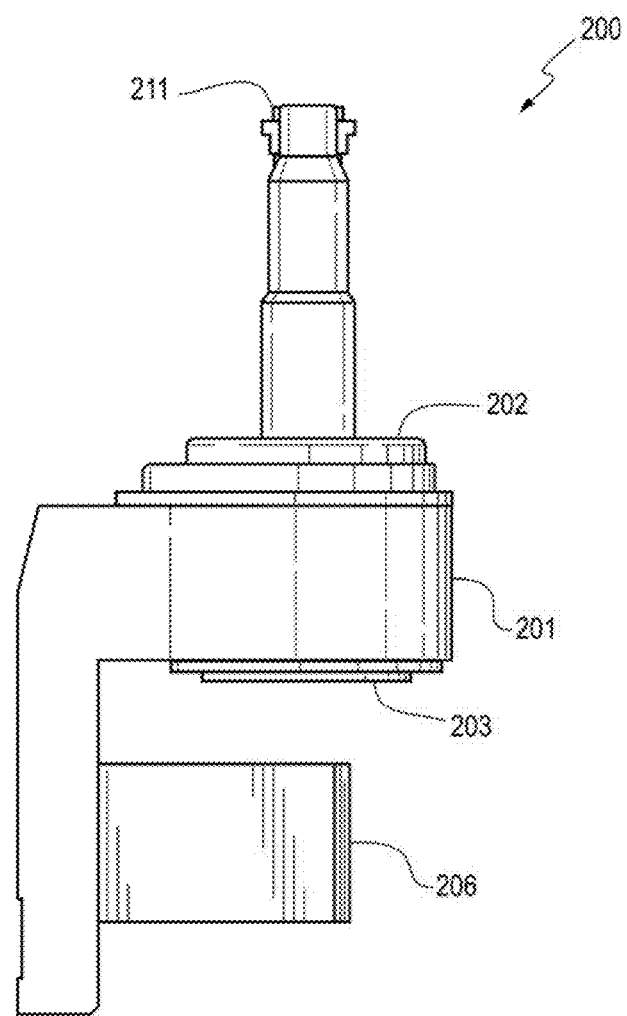
FIG. 5 shows a right-side view of the carrier of FIG. 2.
Figure 6:
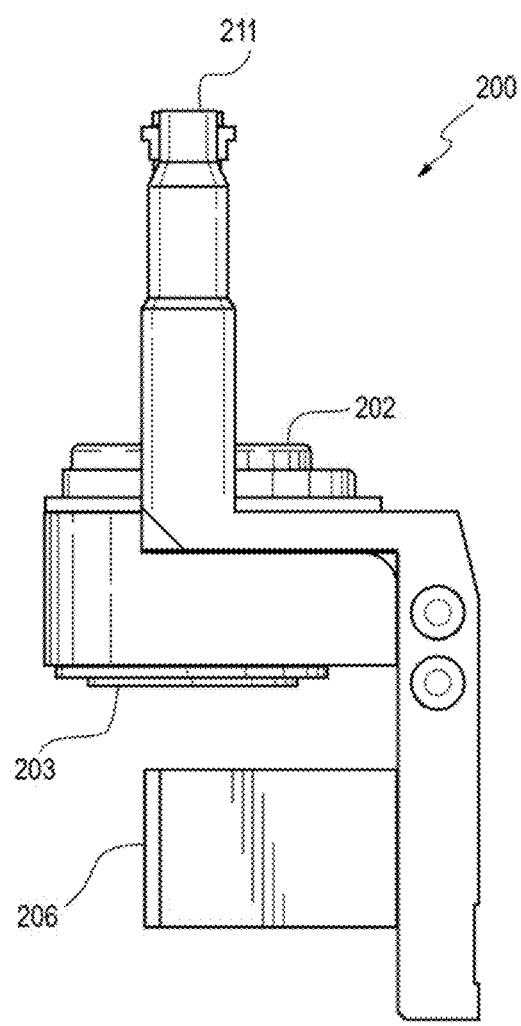
FIG. 6 shows a left side view of the carrier of FIG. 2.
Figure 7:
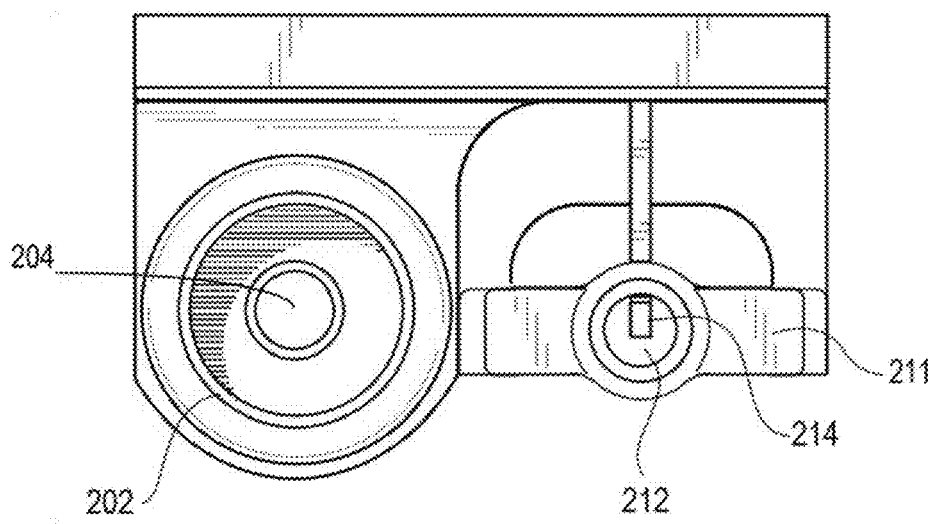
FIG. 7 shows a top view of the carrier of FIG. 2.
Figure 8:
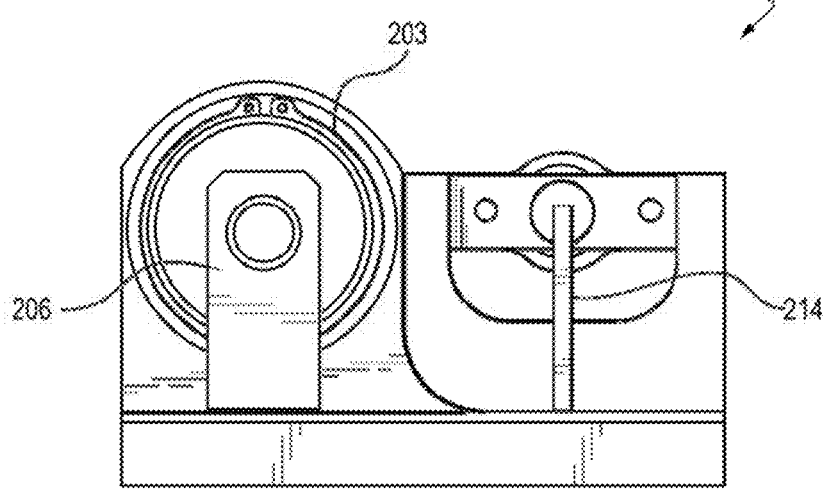
FIG. 8 shows a bottom view of the carrier of FIG. 2.
Figure 9:
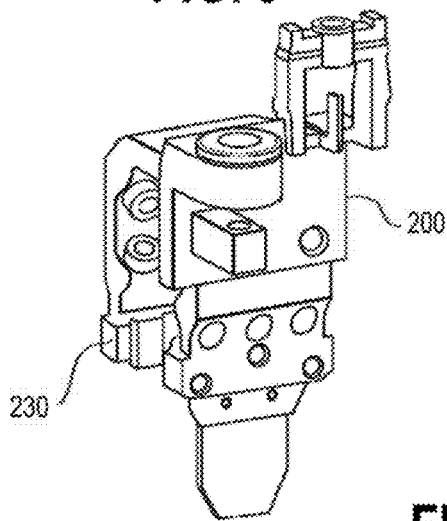
FIG. 9 illustrates an embodiment of a carrier attached to a car.

FIGS. 2-8 show perspective, front, rear, right side, left side, top and bottom views, respectively, of an example of a carrier 200 for transporting components of a vial-based device between assembly stations on an assembly line. The carrier 200 is adapted for attachment to a car 230 designed to be transported along an assembly line 300 (discussed below). For example, a carrier 200 can be bolted to a car 230 through openings 220 as seen in FIGS. 2-4. An embodiment of a carrier 200 attached to a car 230 is illustrated in FIG. 9.

The illustrated carrier 200 includes a receptacle seen on the left side of FIG. 3, for example, that is structured and dimensioned for receiving components of the Bi-Dose device illustrated in FIG. 1. Carrier 200 includes a receptacle seen on the right side of FIG. 3, for example, that is structured and dimensioned for receiving components of the Unit-Dose device illustrated in FIG. 1.

The receptacle seen on the left side of FIG. 3 includes a sleeve 201 surrounding a cylindrical tube having a top 202 that is open wide enough for receipt of an actuator grip 105, having a diameter and a length structured to support an actuator grip 105, and having a bottom 203 with a circular opening 204 that is wide enough for at least part of a vial holder 101 to pass through the opening 204 but narrow enough to prevent an actuator grip 105 from passing through the opening 204. The receptacle seen on the left side of FIG. 3 also includes a bottom support 206, located underneath the bottom 203 of the sleeve 201, that is structured to support at least part of a vial holder 101 passing through the opening 204.

As a result, at least part of a vial holder 101 can pass through the cylindrical tube and through the opening 204, and can be supported by the bottom support 206 and by the bottom 203 of the cylindrical tube. Then, a filled vial 103 can be inserted into the vial holder 101. Then, an actuator grip 105 can be inserted over and can surround at least part of the vial holder 101 and the filled vial 103, and can be supported by the cylindrical tube.

Figure 10A:
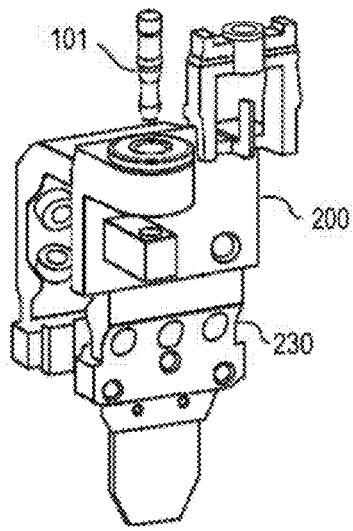
FIG. 10A illustrates an example insertion of a vial holder into the carrier attached to a car.
Figure 10B:
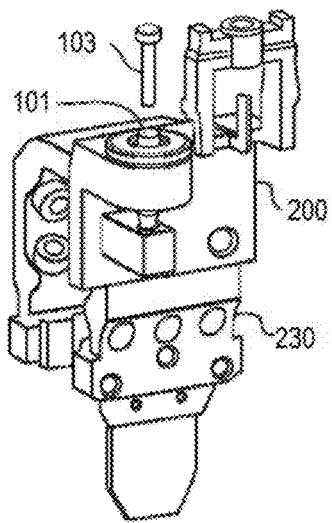
FIG. 10B illustrates an example insertion of a filled vial into the carrier attached to a car.
Figure 10C:
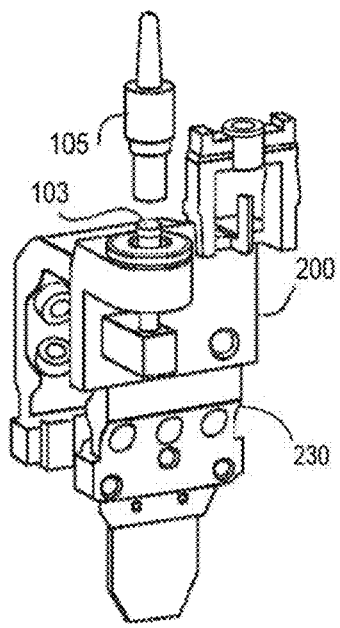
FIG. 10C illustrates an example insertion of an actuator grip into the carrier attached to a car.
Figure 10D:
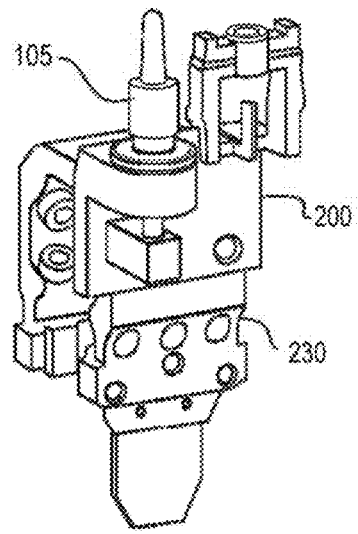
FIG. 10D illustrates an example of an assembled device in the carrier attached to a car.

FIGS. 10A-10D illustrate an example of the sequential insertion of a vial holder 101 (FIG. 10A), insertion of a filled vial 103 (FIG. 10B), insertion of an actuator grip 105 (FIG. 10C), and an assembled Bi-Dose device in the receptacle seen on the left side of FIG. 10D.

In the illustrated embodiment, the combination of the bottom support 206 and the bottom 203 of the cylindrical tube constitute a vial holder support, and the cylindrical tube constitutes an actuator grip support. Many embodiments can be devised, as long as they are structured and dimensioned for receiving and supporting components of a device being assembled along an assembly line.

In some embodiments, the cylindrical tube is freely rotatable about its vertical axis to any angular orientation within the receptacle seen on the left side of FIG. 3. For example, it can rotate freely within sleeve 201. For example, this ability to rotate facilitates the application of a wrap-around label to an assembled device. The label can be applied at one point, and then the device can be rotated 360° while applying pressure via a belt to ensure that the label adheres to the device.

The receptacle seen on the right side of FIG. 3 includes a top support 211 having a length and a width structured to allow an actuator grip 115 to fit over and to be supported by the top support 211, and having a circular opening 212 that is wide enough for at least part of a vial holder 111 to pass through the opening 212. The receptacle seen on the right side of FIG. 3 also includes a bottom support 214, located underneath the top support 211, and structured to support at least part of the vial holder 111 passing through the opening 212.

As a result, at least part of a vial holder 111 can pass through the opening 212, and can be supported by the bottom support 214 and by the top support 211. Then, a filled vial 113 can be inserted into the vial holder 111. Then, an actuator grip 115 can be inserted over and can surround the top support 211 and at least part of the vial holder 111 and the filled vial 113, and can be supported by the top support 211.

Figure 11A:
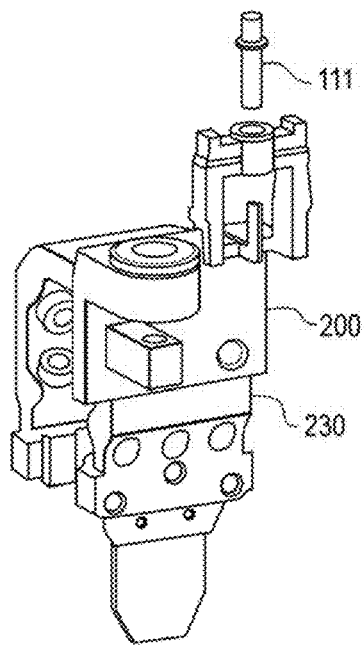
FIG. 11A illustrates an example insertion of a different vial holder into the carrier attached to a car.
Figure 11B:
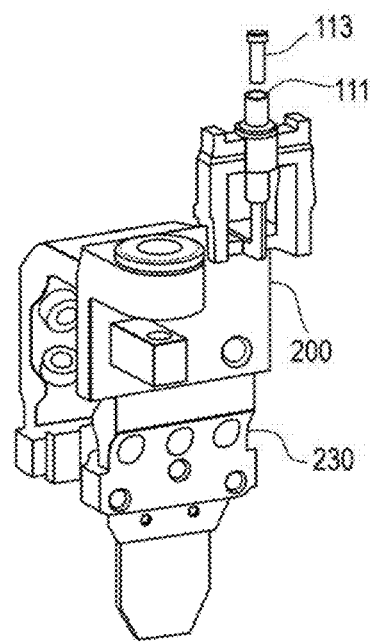
FIG. 11B illustrates an example insertion of a different filled vial into the carrier attached to a car.
Figure 11C:
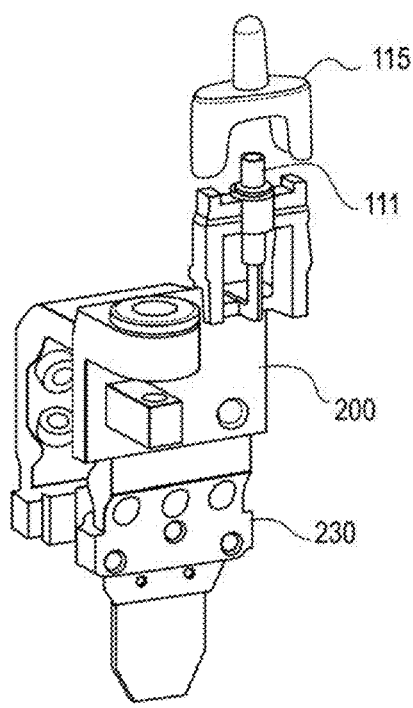
FIG. 11C illustrates an example insertion of a different actuator grip into the carrier attached to a car.
Figure 11D:
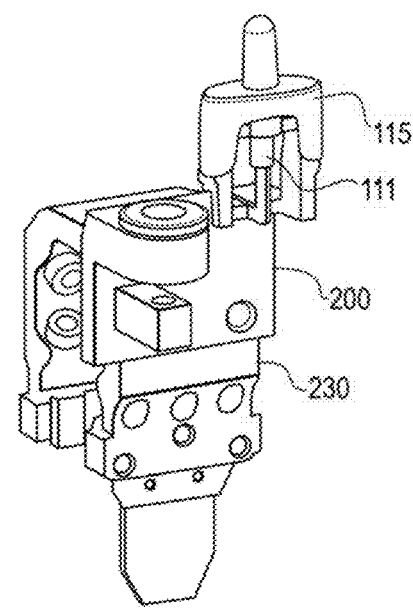
FIG. 11D illustrates an example of a different assembled device in the carrier attached to a car.

FIGS. 11A-11D illustrate an example of the sequential insertion of a vial holder 111 (FIG. 11A), insertion of a filled vial 113 (FIG. 11B), insertion of an actuator grip 115 (FIG. 11C), and an assembled Unit-Dose device in the receptacle seen on the right side of FIG. 11D.

In the illustrated embodiment, the combination of the bottom support 214 and the top support 211 constitute a vial holder support, and the top support 211 constitutes an actuator grip support. Many embodiments can be devised, as long as they are structured and dimensioned for receiving and supporting components of a device being assembled along an assembly line.

Figure 12:
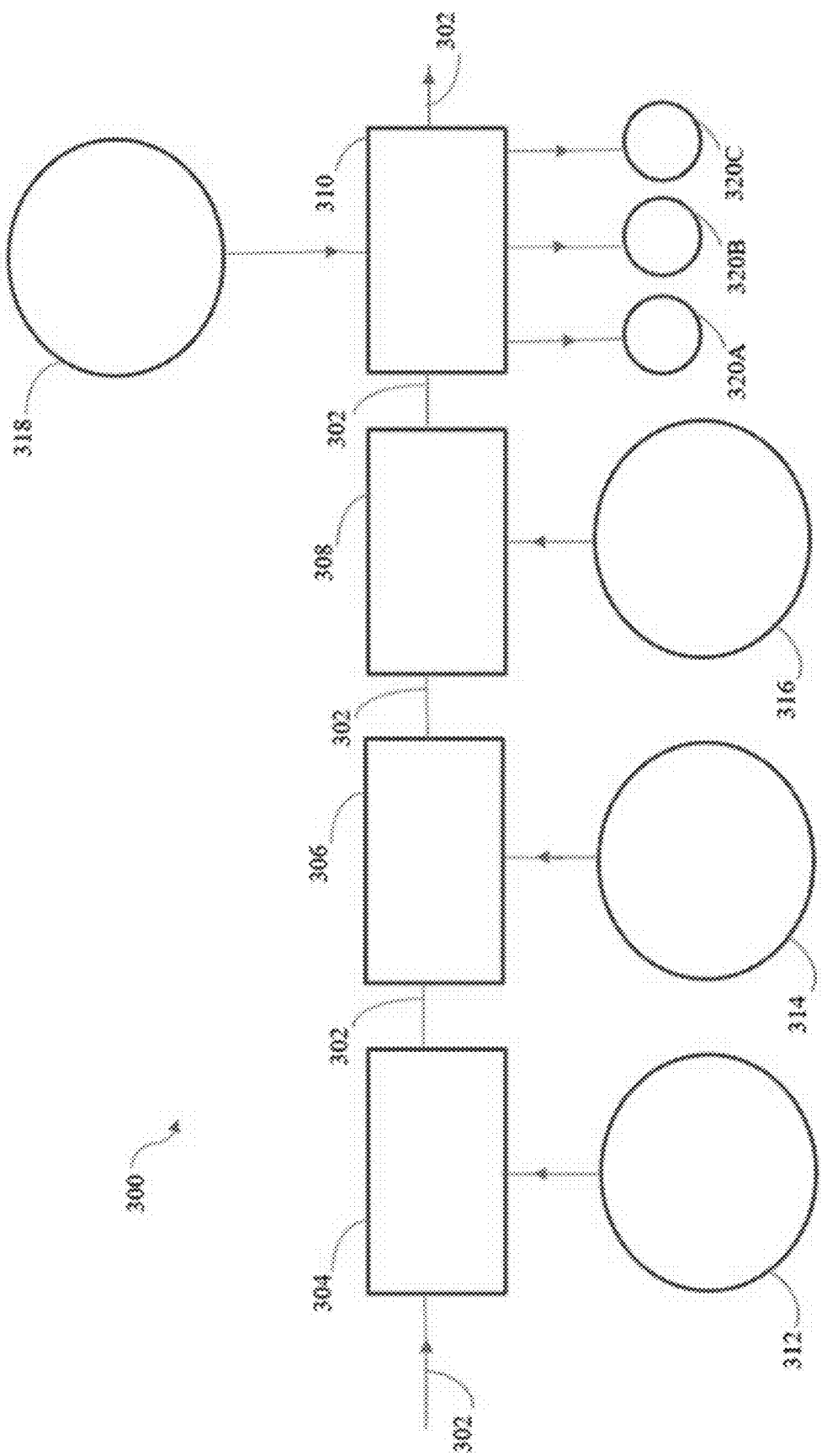
FIG. 12 is a schematic representation of an exemplary assembly line using the carrier of FIG. 2.

FIG. 12 is a schematic representation of an exemplary assembly line 300 for assembling both the Bi-Dose and the Unit-Dose devices whose components are illustrated in FIG. 1. A series of carriers 200 is attached to a series of cars 230, respectively, forming a series of car/carriers such as those illustrated in FIG. 9. The car/carriers are transported along a conveyor system 302 between a series of assembly stations including, for example, a vial holder insertion station 304, a filled vial insertion station 306, an actuator grip insertion station 308, and a packaging directing station 310.

In the illustrated example, vial holder feeder 312 is loaded with vial holders selected for the device being assembled, and sends the vial holders to vial holder insertion station 304 where a vial holder is inserted into the applicable receptacle of each carrier 200. Filled vial feeder 314 is loaded with filled vials selected for the device being assembled, and sends the filled vials to filled vial insertion station 306 where a filled vial is inserted into the vial holder that has been inserted into each carrier 200. Actuator grip feeder 316 is loaded with actuator grips selected for the device being assembled, and sends the actuator grips to actuator grip insertion station 308 where an actuated grip is inserted over and surrounds at least part of each vial holder/filled vial that has been inserted into each carrier 200. Label feeder 318 is loaded with labels selected for the device being assembled, and sends the labels to packaging directing station 310 where a label is applied to each assembled device and the device is directed to a selected packaging station 320A, 320B, or 320C, for example.

In some embodiments, the packaging directing station 310 comprises a labeling station having a plurality of labeling modules. In one example, the labeling station comprises a labeling module that is capable of applying wrap-around labels and spot labels. In the case of the Bi-Dose device, as set forth above, the receptacle allows for rotation of an assembled device to facilitate application of a wrap-around label. A first labeling module includes, for example, two servo-driven conveyor belts to rotate the Bi-Dose device at a speed synchronized with the carrier travel to apply a wrap-around label. For devices that are not amenable to rotation, front and back labels may be applied. In one example, a second labeling module is added. For example at the first labeling module, a first side label (e.g., back of the device) may be applied to a Unit Dose device, and at the second labeling module, a second side label (e.g., front) may be applied to a Unit Dose device. The labeling modules may include a laser to write data onto labels and a vision system to optically inspect labels before application to a device. In this way, different labeling requirements can be accomplished without change-over of any equipment on the assembly line.

Because each carrier 200 can be used in assembling either a Bi-Dose device or a Unit-Dose device in the described example, carriers 200 attached to cars 230 can be transported along conveyor system 302 without change or alteration when the assembly line is switched from assembling the Bi-Dose device to assembling the Unit-Dose device, and vice versa.

When switching from assembling one device to assembling the other, the applicable components and labels are fed in bulk to the vial holder feeder 312, the filled vial feeder 314, the actuator grip feeder 316 and the label feeder 318, respectively. However, same carriers 200 continue to be transported along the conveyor system 302.

In some embodiments, multiple carriers 200 move together from one assembly station 304, 306, 308 and 310 to the next. For example, each assembly station 304, 306, 308 and 310 can be designed to accommodate eight carriers 200 simultaneously. When the function of each of the assembly stations 304, 306, 308 and 310 is completed, all eight carriers 200 at each of the assembly stations 304, 306 and 308 are transported to the next assembly station 306, 308 and 310, the empty carriers 200 at packaging directing station 310 move on, and a new set of eight empty carriers 200 arrive at vial holder insertion station 304. In some embodiments, the conveyor system 302 uses electro-magnetic pulses to transport the cars 230 between the assembly stations 304, 306, 308 and 310.

Figure 13:
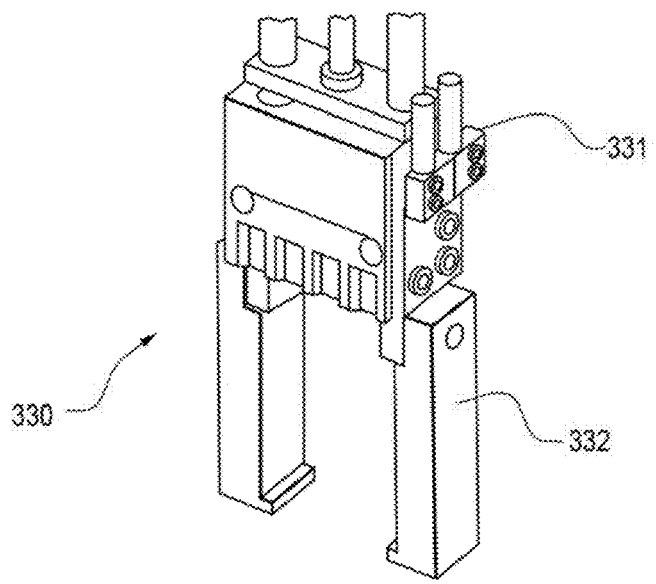
FIG. 13 illustrates an example of a pull-test mechanism.

Various features specific to the devices being assembled are built into the assembly line 300. For example, there can be quality control tests to confirm the integrity and operability of a component. In some embodiments, the assembly line 300 can include a pull-test mechanism 330 such as illustrated in FIG. 13. The test mechanism 330 has a first part 331 for gripping an actuator grip 115 of at least the Unit-Dose devices after assembled, and a second part 332 for gripping a vial holder 111 of at least the Unit-Dose devices after assembled. The first and second parts 331 and 332 are connected by a spring and are operated by temporarily pulling them apart to a specified tension to test whether the actuator grip 115 is secured to the vial holder 111. Typically, vial holder 111 has a snap ring 112 for retaining vial holder 111 within actuator grip 115. The first part 331 has a cup for holding a top of actuator grip 115, the second part 332 has two legs for holding vial holder 111, and pull-test mechanism 330 detects whether the snap ring 112 has been damaged and is not performing its function.

The following are examples of some other features included in the assembly line 300 in some embodiments. For example, the assembly line 300 can include reference mechanisms to ensure the correct spacing of carriers 200 at the assembly stations 304, 306, 308 and 310. There can be sensors to ensure that the carriers 200 are empty when they arrive at vial holder insertion station 304. There can be pick-and-place A robots at each of the assembly stations 304, 306, 308 and 310 for accurate insertion of components into the applicable receptacle for the device being assembled, or for transfer of assembled devices from the receptacles to mover pucks 340 (discussed below).

The alternative packaging stations 320A, 320B, or 320C, for example, accommodate not only the two different devices, but also allow for different types of packaging such as for individual devices or for different numbers of multiple devices, and allow for the use of different types of packaging materials. The packaging directing station 310 can be controlled to direct certain numbers of devices to the selected packaging stations 320A, 320B, and 320C, for example.

Figure 14A:
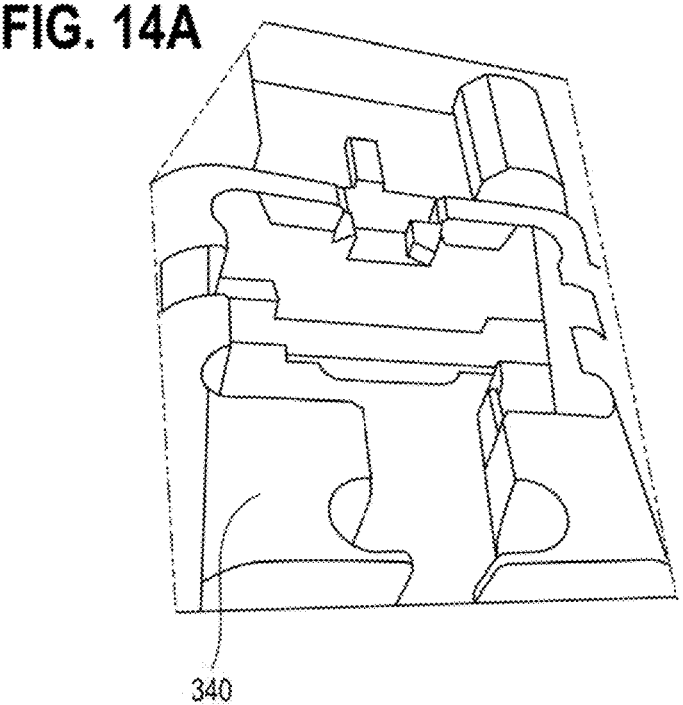
FIG. 14A illustrates an exemplary mover puck.
Figure 14B:
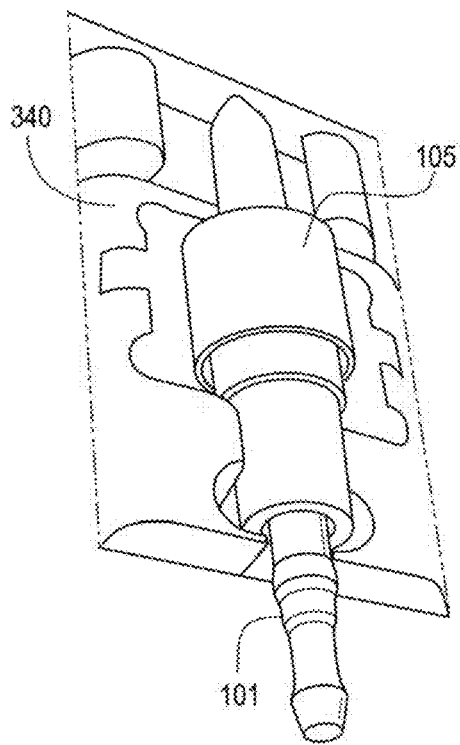
FIG. 14B illustrates the mover puck of FIG. 14A occupied by an assembled Bi-Dose device.
Figure 14C:
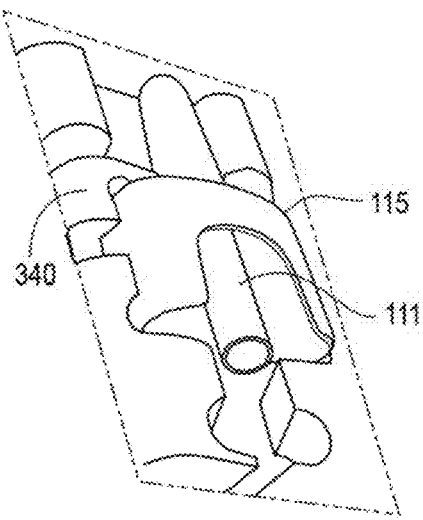
FIG. 14C illustrates the mover puck of FIG. 14A occupied by an assembled Unit-Dose device.

FIG. 14A is an illustration of an exemplary mover puck 340 structured and dimensioned so that any individual mover puck 340 can accommodate either an assembled Bi-Dose device or an assembled Unit-Dose device, whichever is required. FIG. 14B illustrates an assembled Bi-Dose device placed in a mover puck 340. FIG. 14C illustrates an assembled Unit-Dose device placed in a mover puck 340. The mover pucks 340 are holders into which an assembled device can be placed for transport along a conveyor belt. For example, individual assembled devices that are removed from carriers 200 at packaging directing station 310 can be placed in respective mover pucks 340 for transport to a selected packaging station 320A, 320B, or 320C, for example.

It will be understood that the disclosed carrier and assembly line device can be modified without departing from the teachings of the invention. Accordingly, the scope of the invention is to be limited only as necessitated by the accompanying claims.

The invention claimed is:

1. A method of operating an assembly line having assembly stations and a plurality of carriers for transporting components of a vial-based device between the assembly stations, each carrier comprising first and second device receptacles, the first device receptacle being structured and dimensioned differently than the second device receptacle, the first device receptacle being adapted for receiving components of a first vial-based device, and the second device receptacle being adapted for receiving components of a second vial-based device, and the carrier being adapted for attachment to a car that travels along the assembly line, the plurality of carriers being arranged in a series of cars, the method comprising:
   assembling a plurality of either one of the first and second vial-based devices;
   switching the assembly line to assemble the other one of the first and second vial-based devices without changing or altering the series of the carriers on the assembly line; and
   assembling a plurality of the other one of the first and second vial-based devices.

2. The method according claim 1, wherein the first device receptacle comprises:
   a cylindrical tube, having a top that is open wide enough for receipt of a first actuator grip of the first vial-based device, having a diameter and a length structured to support the first actuator grip, and having a bottom with a circular opening that is wide enough for at least part of a first vial holder of the first vial-based device to pass through the opening but narrow enough to prevent the first actuator grip from passing through the opening; and
   a bottom support located underneath the bottom of the cylindrical tube, and structured to support the at least part of the first vial holder passing through the opening.

3. The method according to claim 2, wherein, in operation,
   the at least part of the first vial holder passes through the cylindrical tube and through the opening, and is supported by the bottom support and by the bottom of the cylindrical tube;
   a first filled vial of the first vial-based device is inserted into the first vial holder after the at least part of the first vial holder has passed through the cylindrical tube and through the opening and the at least part of the first vial holder is supported by the bottom support and by the bottom of the cylindrical tube; and
   the first actuator grip is inserted over and surrounds at least part of the first vial holder and the first filled vial, and is supported by the cylindrical tube, after the first filled vial has been inserted into the first vial holder.

4. The method according to claim 2, wherein the cylindrical tube is freely rotatable about its vertical axis to any angular orientation within the first device receptacle.

5. The method according to claim 1, wherein the second device receptacle comprises:
   a top support having a length and a width structured to allow a second actuator grip of the second vial-based device to fit over and to be supported by the top support, and having a circular opening that is wide enough for at least part of a second vial holder of the second vial-based device to pass through the opening; and
   a bottom support located underneath the top support, and structured to support the at least part of the second vial holder passing through the opening.

6. The method according to claim 5, wherein, in operation,
   the at least part of the second vial holder passes through the opening, and is supported by the bottom support and by the top support;
   a second filled vial of the second vial-based device is inserted into the second vial holder after the at least part of the second vial holder has passed through the opening and the at least part of the second vial holder is supported by the bottom support and by the top support; and the second actuator grip is inserted over and surrounds the top support and at least part of the second vial holder and the filled second vial, and is supported by the top support, after the second filled vial has been inserted into the second vial holder.

7. The method according to claim 1, wherein the first device receptacle comprises a first vial holder support for receiving a first vial holder of the first vial-based device.

8. The method according to claim 1, wherein the first device receptacle comprises a first actuator grip support for receiving a first actuator grip of the first vial-based device.

9. The method according to claim 1, wherein the second device receptacle comprises a second vial holder support for receiving a second vial holder bf the second vial-based device.

10. The method according to claim 1, wherein the second device receptacle comprises a second actuator grip support for receiving a second actuator grip of the second vial-based device.

\* \* \* \* \*